United States Patent
Na

(10) Patent No.: US 8,432,816 B2
(45) Date of Patent: Apr. 30, 2013

(54) VOIP TERMINAL HAVING QOS MONITORING FUNCTION AND QOS MONITORING METHOD

(75) Inventor: Jeong-Hwan Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1669 days.

(21) Appl. No.: 11/505,318

(22) Filed: Aug. 17, 2006

(65) Prior Publication Data

US 2007/0058546 A1    Mar. 15, 2007

(30) Foreign Application Priority Data

Aug. 19, 2005  (KR) .................... 10-2005-0076312

(51) Int. Cl.
*H04J 1/16* (2006.01)
*H04L 12/26* (2006.01)
*H04Q 1/20* (2006.01)
*H04B 17/00* (2006.01)
*H04W 24/00* (2009.01)
*G06F 15/173* (2006.01)

(52) U.S. Cl.
USPC ........... 370/252; 370/230; 370/233; 370/234; 370/243; 370/244; 379/1.01; 379/1.03; 379/15.03; 379/32.01; 709/223; 709/224; 455/423; 455/424; 455/67.11; 455/115.1; 375/224; 375/225; 375/226

(58) Field of Classification Search .................. 370/241, 370/249, 252, 253, 230–235, 243–245; 379/1.01, 379/1.03, 15.03, 32.01; 455/423–425, 67.11–67.7, 455/115.1–115.4; 709/223–224; 375/224–228
See application file for complete search history.

(56) References Cited

U.S. PATENT DOCUMENTS

| | | | |
|---|---|---|---|
| 7,430,179 B2 * | 9/2008 | Towns-von Stauber et al. | 370/252 |
| 7,433,319 B2 * | 10/2008 | Schine et al. | 370/248 |
| 2002/0051464 A1 * | 5/2002 | Sin et al. | 370/466 |
| 2003/0088690 A1 * | 5/2003 | Zuckerman et al. | 709/232 |
| 2004/0071084 A1 * | 4/2004 | El-Hennawey et al. | 370/230 |
| 2006/0153174 A1 * | 7/2006 | Towns-von Stauber et al. | 370/356 |
| 2006/0190594 A1 * | 8/2006 | Jorgenson et al. | 709/224 |
| 2010/0085986 A1 * | 4/2010 | Anandakumar et al. | 370/474 |

OTHER PUBLICATIONS

Schulzrinne et al., "RTP: A Transport Protocol for Real-Time Applications", Network Working Group, Request for Comments: 3550, The Internet Society, Jul. 2003, pp. 1-104.

* cited by examiner

*Primary Examiner* — Melanie Jagannathan
*Assistant Examiner* — Wutchung Chu
(74) *Attorney, Agent, or Firm* — H.C. Park & Associates, PLC

(57) ABSTRACT

A Voice over Internet Protocol (VoIP) terminal has a Quality of Service (QoS) monitoring function and uses a QoS monitoring method. In a VoIP system performing real-time voice communication over an IP network, a packet loss value and a time-axis index value are detected, and are calculated from a real-time transport protocol (RTP) packet and an RTP control protocol (RTCP) packet, a QoS state value of the network is obtained in real time, the detected QoS state value is compared to a preset QoS state table, and thus a QoS state of the IP network is displayed for users.

13 Claims, 3 Drawing Sheets

|  | GOOD | NORMAL | TRAFFIC INCREASE | CONGESTION |
|---|---|---|---|---|
| CHARACTER | G (GOOD) | N (NORMAL) | B (BUSY) | C (CONGESTION) |
| SYMBOL (ICON) | ○ | ⊙ | ◐ | ● |

VOIP TERMINAL HAVING QOS MONITORING FUNCTION AND QOS MONITORING METHOD

CLAIM OF PRIORITY

This application makes reference to, incorporates the same herein, and claims all benefits accruing under 35 U.S.C. §119 from an application for VoIP TERMINAL PROVIDED FUNCTION OF QoS MONITORING METHOD, earlier filed in the Korean Intellectual Property Office on 19 Aug. 2005 and there duly assigned Serial No. 10-2005-0076312.

BACKGROUND OF THE INVENTION

1. Field of the Invention

The present invention relates to a Voice over Internet Protocol (VoIP) terminal having a Quality of Service (QoS) monitoring function and a QoS monitoring method.

2. Description of the Related Art

Generally, VoIP is a protocol for transferring video, voice and FAX messages over the Internet. With VoIP, a user accesses the Internet using a personal computer (PC) or an independent IP-based device to transmit/receive voice, as the user makes a call to a gateway using a conventional public switched telephone network (PSTN) terminal, or to transmit/receive real time media such as video.

A VoIP end-point device (e.g., a gateway, an IP phone, or a PC) of a sender continuously exchanges real-time transport protocol (RTP) voice packets with a recipient to conduct voice communication through RTP on an IP network. The VoIP end-point device transmits and receives QoS information, such as packet loss value, jitter and delay, and RTP control protocol (RTCP) information including call session information, to and from the recipient at uniform intervals.

RTP is a protocol for transferring real-time data, such as audio or video data, over a multicast or unicast network. The RTP does not provide a connection, generally operates as an upper layer of a user datagram protocol (UDP), and uses multiplexing and checksum features of the UDP.

The RTCP periodically transmits a control packet to a recipient using the following messages: a sender report (SR) including transmission/reception statistics information of an active sender; and a receiver report (RR) including transmission/reception information of participants, not an active sender, a source description (SDES) describing a canonical name (CNAME) and a source name, BYE indicating termination of an RTP session, and application (APP) specifying a function confined to the application upon testing a new application or a new function. The RTCP packet has a fixed header field and a variable field having a length varying with the type of packet. For effective information, several RTCP packets may form one UDP packet.

Recently, a Voice over Wireless LAN (VoWLAN; wireless Internet telephone) technology transmitting voice over a WLAN, which is the most widespread wireless technique, has emerged as a new mobile telephone technology, just as VoIP systems have emerged as a new wired telephone technology. This is because the VoWLAN is inexpensive and convenient because of its mobility, in addition to its having the benefits of wired Internet telephone VoIP.

The VoWLAN transmits voice data over the WLAN. Typical Internet telephones operate on a wired network, while the VoWLAN uses the WLAN as a medium.

The VoWLAN can provide convenient voice communication because of its guaranteed mobility within a coverage area of an access point (AP). In addition, the VoWLAN can provide significant cost savings compared to line-based telephoning since it uses a pre-built network. Particularly, the VoWLAN is advantageous for its ability to adapt to the needs of the future, for example, video telephoning.

Since all voice data in the VoIP are composed as RTP packets and are continuously transmitted over a data network, the VoIP needs a certain network bandwidth to enable smooth communication.

Since VoIP technology uses communication channels of a data communication network (Internet), voice data may be affected by delay, jitter, or loss on the network, as normal data is.

For this reason, measurement of QoS in a VoIP service requires diagnosis of a state of the network. In a QoS measuring method in a voice communication system using conventional VoIP technology, a traffic measuring device is connected to a VoIP packet path to directly parse the VoIP packet, or a QoS state monitoring system is developed to collect data.

However, the QoS measuring method in the voice communication system using conventional VoIP technology requires a separate device or system.

Furthermore, since provided values themselves are sub-classified into Round-Trip delay Time (RTT), jitter, and loss, quality of actual VoIP service may depend on a manager's knowledge and experience. In this regard, the delay (RTT) refers to time measured from the moment a receiving terminal receives packet data from a transmitting terminal until the moment the receiving terminal transmits packet data back to the transmitting terminal.

Also, even in the same network state, terminals having different types or characteristics may be influenced differently. As this has not been considered, the conventional art is not capable of providing optimal functions according to the type or properties of a terminal.

SUMMARY OF THE INVENTION

It is an object of the present invention to provide a VoIP terminal having a QoS monitoring function and a QoS monitoring method, and capable of monitoring a QoS state of a network without using an additional QoS monitoring device.

According to an aspect of the present invention, a VoIP terminal detects a QoS state value from RTP and RTCP packets received from a terminal in communication over a network, and compares the detected QoS state value to a preset QoS state table so as to display a QoS state for users.

The VoIP terminal comprises: a first detector for detecting a packet loss value and a jitter value from the RTCP packet received from the VoIP terminal in communication; a second detector for calculating an RTT value from the RTP and RTCP packets received from the terminal in communication, and for adding the jitter value detected by the first detector to the RTT value to obtain a time-axis index value; and a controller for detecting the QoS state value from the packet loss value and the time-axis index value which are obtained by the first detector and the second detector, respectively, and for comparing the detected QoS state value to the QoS state table to display the QoS state.

The controller may use Equation 1 to calculate the time-axis index value:

$$T_m = D_r + (W_j \times J), \qquad \text{Equation 1}$$

where $T_m$ indicates a delay time value measured by the terminal, $D_r$ indicates an RTT value calculated by the terminal, $W_j$ indicates a weight of a jitter value, and J indicates a detected jitter value.

The QoS state table may include at least one of a network delay time value, the packet loss value, and the QoS state value. The QoS state table uses Equation 2 to calculate a network delay time value in a busy state:

$$Ti=(D_g \times 2)-D_1,$$  Equation 2 where $D_g$ is a one-directional delay value of G.114, and $D_1$ is an RTP packet processing delay value of a terminal.

The RTP packet processing delay value ($D_1$) of the terminal may include at least one of a minimum processing time dependent on the type of a CODEC used in a busy state, a frame size of voice data, a capacity of a jitter buffer, a type of an echo canceller, a delay time in a routine for enhancing quality of voice, and an additional network function processing time (NAT, IPsec, etc.) used in the terminal.

The QoS state value of the QoS state table maybe obtained from an intersection between the network delay time value on an x-axis and the packet loss value on a y-axis. A QoS state value of the QoS state table may include at least one of "Good," "Fair," "Poor," and "Bad", which indicate QoS classes.

The VoIP terminal may include a logging function for performing selective storage only when a quality issue is caused in network state information. The VoIP terminal may limit maximum storage capacity of stored network state data using a circular queue.

According to another aspect of the present invention, a QoS monitoring method in a VoIP terminal comprises the steps of: detecting a packet loss value and a jitter value for an RTP session from an RTCP packet received from a terminal in communication; calculating an RTT value; adding the detected jitter value to the RTT value to obtain a time-axis index value; obtaining a QoS state value from the detected packet loss value and the time-axis index value; and comparing the obtained QoS state value to a QoS state table to display a QoS state.

According to yet another aspect of the present invention, a QoS monitoring device comprises: a QoS state table including a network delay time value, a packet loss value, and a QoS state value; a first detector for detecting a packet loss value and a jitter value from an RTCP packet received from a terminal in communication; a second detector for calculating an RTT value from an RTP packet and the RTCP packet which are received from the terminal in communication, and for adding the jitter value detected by the first detector to the RTT value to obtain a time-axis index value; and a controller for obtaining a QoS state value from the packet loss value and the time-axis index value, which are obtained by the first detector and the second detector, respectively, and for comparing the obtained QoS state value to the QoS state table to display a QoS state of the network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Hereinafter, a VoIP terminal having a QoS monitoring function and a QoS monitoring method according to exemplary embodiments of the present invention will be described in detail with reference to the accompanying drawings. It is to be understood by those skilled in the art that the system configuration described below is illustrative only, and the present invention is not limited to such a configuration.

Figure 1:
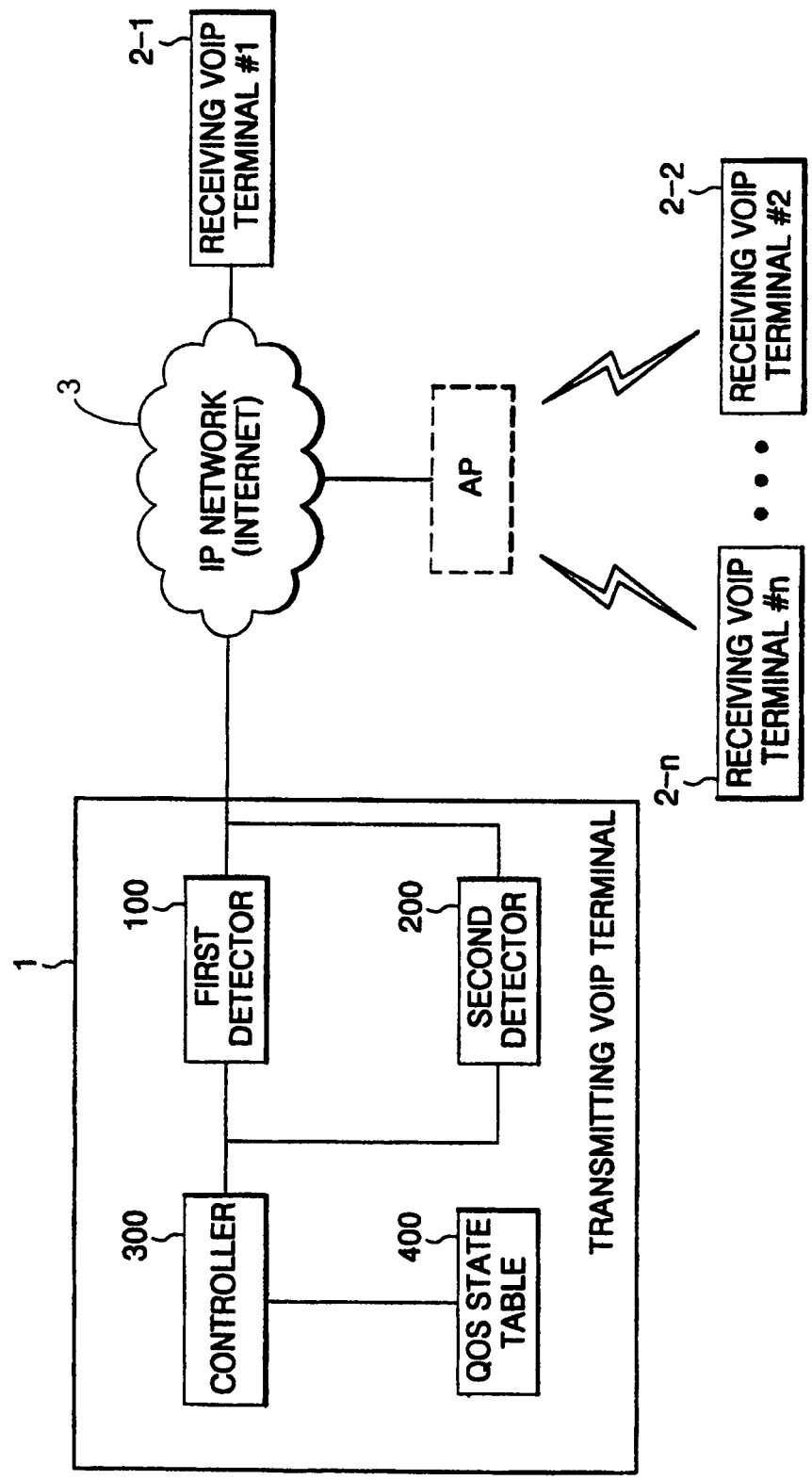
FIG. 1 is a functional block diagram illustrating a VoIP terminal having a QoS monitoring function according to an exemplary embodiment of the present invention.

FIG. 1 illustrates the configuration of a VoIP terminal according to an exemplary embodiment of the present invention. The VoIP terminal 1 includes a first detector 100, a second detector 200, a controller 300, and a QoS state table 400.

The first detector 100 detects a packet loss value and a jitter value from an RTCP packet received from a terminal in communication over an IP network 3.

The second detector 200 calculates an RTT value from an RTP packet and the RTCP packet which are received from the terminal in communication over the IP network 3, and adds the jitter value detected by the first detector 100 to the RTT value in order to obtain a time-axis index value.

The controller 300 obtains a QoS state value from the packet loss value and the time-axis index value, which are obtained by the first detector 100 and the second detector 200, respectively, and compares the obtained QoS state value to the QoS state table 400 so as to display a QoS state of the network. The controller 300 uses Equation 1 to calculate the time-axis index value:

$$T_m = D_r + (W_j \times J),$$  Equation 1 where $T_m$ indicates a delay time value measured by the terminal, $D_r$ indicates an RTT value calculated by the terminal, $W_j$ indicates a weight of a jitter value, and J indicates a detected jitter value.

The QoS state table 400 includes at least one of the network delay time value, the packet loss value, and the QoS state value. The QoS state value in the QoS state table 400 is obtained from an intersection of the network delay time value on an x-axis and the packet loss value on a y-axis. The QoS state value includes at least one of "Good," "Fair," "Poor," and "Bad," which indicate QoS classes.

Figures 2, 3:
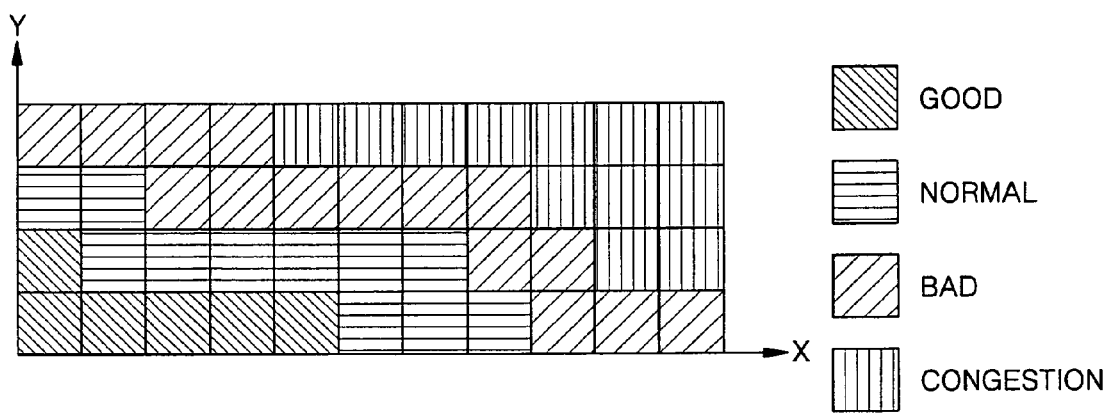
FIG. 2 is a graph illustrating a QoS state table in the VoIP terminal of FIG. 1.
FIG. 3 illustrates a QoS state of a network in the VoIP terminal of FIG. 1.

FIG. 2 is a graph illustrating a QoS state table in the VoIP terminal of FIG. 1. The graph is a network state mapping graph which is a two-dimensional rendering of a three-dimensional graph having a network delay time plotted on an x-axis, a packet loss plotted on a y-axis, and a QoS state plotted on a z-axis.

The QoS state table 400 uses Equation 2 to calculate the network delay time value in a busy state:

$$Ti=(D_g \times 2)-D_1,$$  Equation 2 where $D_g$ is a one-directional delay value of G.114, and $D_1$ is an RTP packet processing delay value of a terminal.

The RTP packet processing delay value ($D_1$) of the terminal includes at least one of a minimum processing time dependent on the type of CODEC used in a busy state, a frame size of voice data, a capacity of a jitter buffer, a type of an echo canceller, a delay time in a routine for enhancing quality of voice, and an additional network function processing time (Network Address Translation (NAT), Internet Protocol Security (IPsec), etc.) used in a terminal.

The VoIP terminal includes a logging function for performing selective storage only when a quality issue is caused in network state information.

Figure 4:
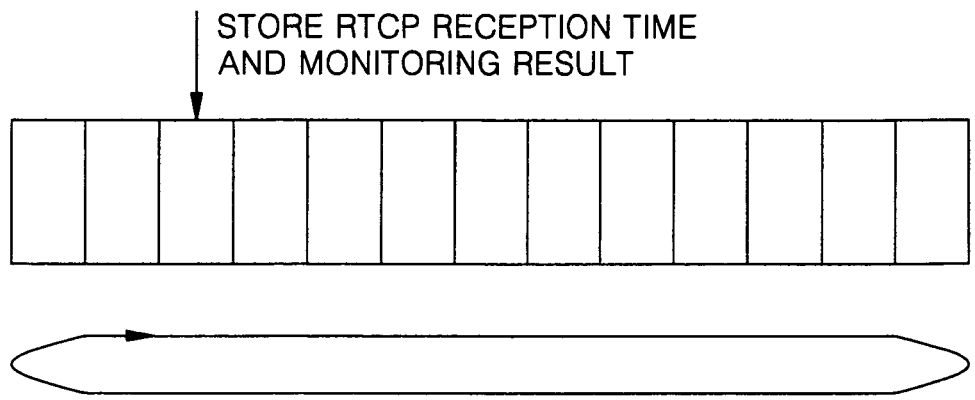
FIG. 4 illustrates a circular queue used to limit data storage capacity in the VoIP terminal of FIG. 1.

FIG. 4 illustrates a circular queue used to limit data storage capacity in the VoIP terminal of FIG. 1. As shown in FIG. 4, the VoIP terminal limits maximum storage capacity of stored network state data using the circular queue.

Detailed descriptions of typical functions and operations of the above-mentioned components will be omitted.

A VoIP terminal is generally connected to an IP network (Internet) and performs real time communication through RTP and RTCP.

A VoIP terminal monitoring the QoS of the network is referred to as a "transmitting VoIP terminal," and a VoIP terminal performing real-time communication with the transmitting VoIP terminal is referred to as a "receiving VoIP terminal."

The transmitting VoIP terminal 1 of FIG. 1 receives an RTP packet and an RTCP packet from a receiving VoIP terminal 2-1, 2-2, or 2-n.

In the transmitting VoIP terminal 1, the first detector 100 detects a packet loss value and a jitter value.

The second detector 200 measures an RTT value with respect to the receiving VoIP terminal 2-1, 2-2, or 2-n. That is, the transmitting VoIP terminal 1 transmits an RTCP packet to the receiving VoIP terminal 2-1, 2-2, or 2-n, and upon receipt of the RTCP packet, the receiving VoIP terminal 2-1, 2-2, or 2-n returns the RTCP packet to the transmitting terminal. In this case, the receiving VoIP terminal 2-1, 2-2, or 2-n includes information about delay time, measured from receipt of the RTCP packet to transmission of the RTCP packet, in the RTCP packet, and transmits the RTCP packet with the delay time information to the transmitting VoIP terminal 1. The transmitting VoIP terminal 1 calculates the RTT value from the received information and time information of the RTCP packet transmitted/received by the transmitting VoIP terminal 1.

In the transmitting VoIP terminal 1, the second detector 200 then adds the calculated RTT value to the jitter value detected by the first detector 100 to obtain a time-axis index value.

The controller 300 of the transmitting VoIP terminal 1 then obtains a QoS state value from the packet loss value and the time-axis index value, which are obtained by the first detector 100 and the second detector 200, respectively, and compares the obtained QoS state value to the QoS state table 400 to display the QoS state. The controller 300 employs Equation 1 to calculate a time-axis index value.

The QoS state table 400 includes at least one of the network delay time value, the packet loss value, and the QoS state value. The QoS state value in the QoS state table 400 is obtained from an intersection of the network delay time value on an x-axis and the packet loss value on a y-axis.

FIG. 3 illustrates a QoS state of a network in the VoIP terminal of FIG. 1. As shown in FIG. 3, the QoS state value includes at least one of "Good," "Fair," "Poor," and "Bad," which indicate QoS classes.

The QoS state table 400 employs Equation 2 to calculate the network delay time value in a busy state.

The VoIP terminal includes a logging function for performing selective storage only when a quality issue is caused in network state information. As shown in FIG. 4, the VoIP terminal limits maximum storage capacity of stored network state data using a circular queue.

Figure 5:
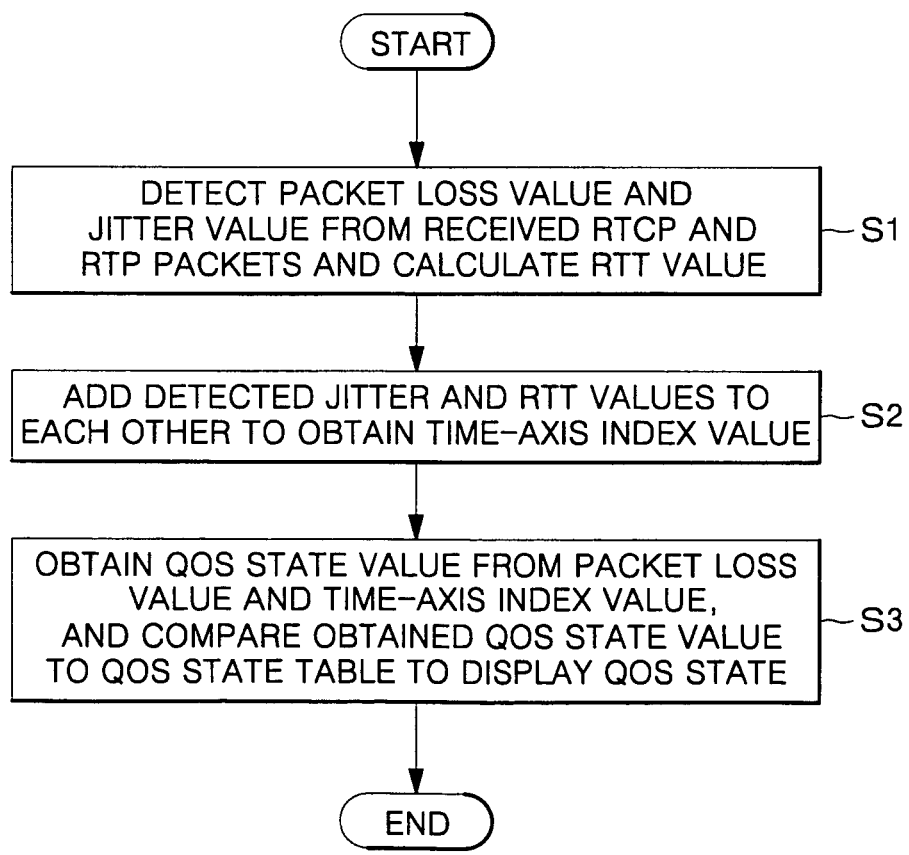
FIG. 5 is a flowchart illustrating a QoS monitoring method in a VoIP terminal according to an exemplary embodiment of the present invention.

A QoS monitoring method in a VoIP terminal having the above-described configuration will be described with reference to FIG. 5, which is a flowchart illustrating a QoS monitoring method in a VoIP terminal according to an exemplary embodiment of the present invention.

First, a packet loss value and a jitter value for an RTP session are detected from RTCP and RTP packets which are received from a terminal in a busy state, and an RTT value is calculated (S1).

The detected jitter and RTT values are then added to each other to obtain a time-axis index value (S2).

A QoS state value is then obtained from the packet loss value and time-axis index value, and the obtained QoS state value is compared to the QoS state table 400 to display the QoS state (S3). In step S3, in which the QoS state value is compared to the QoS state table 400 to display the QoS state, Equation 1 is used to calculate the time-axis index value.

In step S3, in which the QoS state value is compared to the QoS state table so as to display the QoS state, the QoS state table 400 employs Equation 2 to calculate the network delay time value in a busy state.

The QoS state table 400 includes at least one of the network delay time value in a busy state, the packet loss value, and the QoS state value. The QoS state value is obtained from an intersection of the network delay time value on the x-axis and the packet loss value on the y-axis, and includes at least one of "Good," "Fair," "Poor," and "Bad," which indicate QoS classes.

The network QoS monitoring method includes a logging function for performing selective storage only when a quality issue is caused in network state information. Maximum storage capacity of stored network state data is limited by a circular queue.

According to another exemplary embodiment of present invention, a QoS monitoring device includes the first detector 100, the second detector 200, the controller 300, and the QoS state table 400 of FIG. 1.

The first detector 100 detects a packet loss value and a jitter value from the RTCP packet received from the terminal in communication over the IP network 3.

The second detector 200 calculates an RTT value from an RTCP packet carrying control information of an RTP packet which is received from a terminal in communication over the IP network 3, and adds the jitter value detected by the first detector 100 to the RTT value to obtain a time-axis index value.

The controller 300 obtains a QoS state value from the packet loss value and the time-axis index value, which are obtained by the first detector 100 and the second detector 200, respectively, and compares the obtained QoS state value to the QoS state table 400 to display a QoS state of the network. The controller 300 uses Equation 1 to calculate the time-axis index value.

$$T_m = D_r + (W_j \times J),\qquad \text{Equation 1}$$

where $T_m$ indicates a delay time value measured by the terminal, $D_r$ indicates an RTT value calculated by the terminal, $W_j$ indicates a weight of a jitter value, and $J$ indicates a detected jitter value.

The QoS state table 400 includes at least one of the network delay time value, the packet loss value, and the QoS state value. The QoS state value in the QoS state table 400 is obtained from an intersection of the network delay time value on an x-axis and the packet loss value on a y-axis. The QoS state value includes at least one of "Good," "Fair," "Poor," and "Bad," which indicate QOS classes.

As mentioned above, FIG. 2 is a network state mapping graph illustrating a QoS state table. The network state mapping graph is a two-dimensional rendering of a three-dimensional graph having a network delay time plotted on an x-axis, a packet loss plotted on a y-axis, and a QoS state plotted on a z-axis.

The QoS state table 400 uses Equation 2 to calculate the network delay time value in a busy state:

$$Ti=(D_g \times 2)-D_1, \quad \text{Equation 2}$$

where $D_g$ is a one-directional delay value of G.114, and $D_1$ is an RTP packet processing delay value of a terminal.

The RTP packet processing delay value ($D_1$) of the terminal includes at least one of a minimum processing time dependent on the type of CODEC used in a busy state, a frame size of voice data, a capacity of a jitter buffer, a type of an echo canceller, a delay time in a routine for enhancing quality of voice, and an additional network function processing time (NAT, IPsec, etc.) used in a terminal.

With the VoIP terminal having the QoS monitoring function and the QoS monitoring method according to the embodiments of the present invention, it is possible for a user of the VoIP terminal to monitor the QoS state of the network in real time in a busy state.

It is also possible to provide more exact monitoring data by determining the range of QoS in view of the type and features of the VoIP terminal. The monitoring result is displayed as one value, not sub-divided into several items, so that a user easily understands the monitoring result.

Sub-divided QoS data can be provided by a logging function, so that skilled persons can conduct detailed analysis. It is also possible to save a memory of a VoIP terminal by logging data only when a problem occurs, and to compress and provide only data having high availability.

While the present invention has been described with reference to exemplary embodiments thereof, it will be understood by those skilled in the art that various changes in form and detail may be made therein without departing from the scope of the present invention as defined by the following claims.

What is claimed is:

1. A Voice over Internet Protocol (VoIP) terminal, comprising:
    a first detector to detect a packet loss value and a jitter value from a Real-Time Transport Control Protocol (RTCP) packet received from a terminal in communication the VoIP terminal over a network;
    a second detector to calculate a Round-Trip delay Time (RTT) value from a Real-Time Transport Protocol (RTP) packet and RTCP packet which are received from the terminal, and to add the jitter value detected by the first detector to the RTT value to obtain a time-axis index value;
    a controller to determine a QoS state value from the packet loss value and the time-axis index value to compare the determined QoS state value to a QoS state value of a QoS state table, and to display a QoS state;
    wherein the QoS state table comprises at least one of a network delay time value, the packet loss value, and the QoS state value of the QoS state table; and
    wherein the QoS state value of the QoS state table is obtained from an intersection between the network delay time value on an x-axis and the packet loss value on a y-axis.

2. The VoIP terminal according claim 1, wherein the controller calculates the time-axis index value using the following equation:

$$T_m=D_r+(W_j \ast J),$$

wherein $T_m$ indicates a delay time value measured by the terminal, $D_r$ indicates an RTT value calculated by the terminal, $W_j$ indicates a weight of a jitter value, and J indicates a detected jitter value.

3. The VoIP terminal according to claim 1, wherein the QoS state table is used to calculate a network delay time value in a busy state using the following equation:

$$Ti=(D_g \ast 2)-D_1,$$

where Ti is the network delay time value in the busy state, $D_g$ is a one-directional delay value of G.114, and $D_1$ is an RTP packet processing delay value of a terminal.

4. The VoIP terminal according to claim 1, wherein a RTP packet processing delay value ($D_1$) of the terminal comprises at least one of a minimum processing time dependent on a type of CODEC used in a busy state, a frame size of voice data, a capacity of a jitter buffer, a type of an echo canceller, a delay time in a routine for enhancing quality of voice, and an additional network function processing time used in the terminal.

5. The VoIP terminal according claim 1, wherein the VoIP terminal comprises a logging function to perform selective storage only when a quality issue is noted in network state information.

6. A Quality of Service (QoS) monitoring method in a Voice over Internet Protocol (VoIP) terminal, the method comprising:
    detecting a packet loss value and a jitter value for a Real-time Transport Protocol (RTP) session from a Real-time Transport Control Protocol (RTCP) packet received from a terminal in communication with the VoIP terminal;
    calculating a Round-Trip delay Time (RTT) value; adding the detected jitter value to the RTT value to obtain a time-axis index value;
    obtaining a QoS state value from the detected packet loss value and the time-axis index value; and
    comparing the obtained QoS state value to a QoS state value of a QoS state table to display a QoS state;
    wherein the QoS state table comprises at least one of a network delay time value in a busy state, the packet loss value, and the QoS state value of the QoS state table; and
    wherein the QoS state value of the QoS state table is obtained from an intersection of the network delay time value on an x-axis and the packet loss value on a y-axis.

7. The method according to claim 6, wherein a network delay time value in a busy state is calculated using the QoS state table and using the following equation:

$$Ti=(D_g \ast 2)-D1,$$

wherein $T_i$ is the network delay time value in the busy state, $D_g$ is a one-directional delay value of G.114, and $D_1$ is an RTP packet processing delay value of a terminal.

8. The method according to claim 6, wherein a RTP packet processing delay value of the terminal comprises at least one of a minimum processing time dependent on a type of CODEC used in a busy state, a frame size of voice data, a capacity of a jitter buffer, a type of an echo canceller, a delay time in a routine for enhancing quality of voice, and an additional network function processing time used in the terminal.

9. The method according claim 6, wherein comparing the obtained QoS state value to the QoS state value of the QoS state table comprises calculating the time-axis index value using the following equation:

$$T_m=D_r+(W_j \ast J),$$

wherein $T_m$ indicates a delay time value measured by the terminal, $D_r$ indicates an RTT value calculated by the terminal, $W_j$ indicates a weight of a jitter value, and J indicates a detected jitter value.

10. A Quality of Service (QoS) monitoring device, comprising:
- a QoS state table comprising a network delay time value, a packet loss value, and a QoS state value;
- a first detector to detect a packet loss value and a jitter value from a Real-time Transport Control Protocol (RTCP) packet received from a terminal;
- a second detector to calculate a Round-Trip delay Time (RTT) value from a Real-time Transport Protocol (RTP) packet and the RTCP packet which are received from the terminal, and to add the jitter value detected by the first detector to the RTT value to obtain a time-axis index value; and
- a controller to obtain a QoS state value from the packet loss value and the time-axis index value, and to compare the obtained QoS state value to the QoS state value of the QoS state table to display a QoS state of the network;
- wherein the QoS state table comprises at least one of a network delay time value, the packet loss value, and the QoS state value of the QoS state table; and
- wherein the QoS state value of the QoS state table is obtained from an intersection between the network delay time value on an x-axis and the packet loss value on a y-axis.

11. The device according to claim 10, wherein a network delay time value in a busy state is calculated using the following equation:

$$Ti=(D_g*2)-D_1,$$

wherein $T_i$ is the network delay time value in the busy state, $D_g$ is a one-directional delay value of G.114, and $D_1$ is an RTP packet processing delay value of a terminal.

12. The device according to claim 11, wherein a RTP packet processing delay value ($D_1$) of the terminal comprises at least one of a minimum processing time dependent on a type of CODEC used in a busy state, a frame size of voice data, a capacity of a jitter buffer, a type of an echo canceller, a delay time in a routine for enhancing quality of voice, and an additional network function processing time used in the terminal.

13. The device according claim 10, wherein the controller calculates the time-axis index value using the following equation:

$$T_m=D_r+(W_j*J),$$

wherein $T_m$ indicates a delay time value measured by the terminal, $D_r$ indicates an RTT value calculated by the terminal, $W_j$ indicates a weight of a jitter value, and J indicates a detected jitter value.

* * * * *

UNITED STATES PATENT AND TRADEMARK OFFICE
CERTIFICATE OF CORRECTION

| | | |
|---|---|---|
| PATENT NO. | : 8,432,816 B2 | Page 1 of 1 |
| APPLICATION NO. | : 11/505318 | |
| DATED | : April 30, 2013 | |
| INVENTOR(S) | : Na | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1780 days.

Signed and Sealed this
Sixth Day of January, 2015

Michelle K. Lee
*Deputy Director of the United States Patent and Trademark Office*